April 18, 1967 J. P. FIORE ETAL 3,314,161
AIR SYSTEM AND CART FOR SCREEN CONVEYOR
Filed Aug. 25, 1964 6 Sheets-Sheet 1

INVENTORS
JOSEPH P. FIORE
THADDEUS J. HAJDUK
RAYMOND J. PEKOSH
BY Francis W. Crotty
ATTORNEY

April 18, 1967 J. P. FIORE ETAL 3,314,161
AIR SYSTEM AND CART FOR SCREEN CONVEYOR
Filed Aug. 25, 1964 6 Sheets-Sheet 5

FIG. 5

April 18, 1967 J. P. FIORE ETAL 3,314,161
AIR SYSTEM AND CART FOR SCREEN CONVEYOR
Filed Aug. 25, 1964 6 Sheets-Sheet 6

United States Patent Office 3,314,161
Patented Apr. 18, 1967

3,314,161
AIR SYSTEM AND CART FOR
SCREEN CONVEYOR
Joseph P. Fiore, Wheeling, and Thaddeus J. Hajduk and
Raymond J. Pekosh, Chicago, Ill., assignors to The
Rauland Corporation, Chicago, Ill., a corporation of
Illinois
Filed Aug. 25, 1964, Ser. No. 391,985
10 Claims. (Cl. 34—105)

The present invention relates to cathode-ray tube processing apparatus and, more particularly, apparatus for screening tri-color cathode-ray tubes.

A screening plant for the shadow-mask type of tri-color tube is described and claimed in application, Ser. No. 391,864, filed concurrently herewith in the name of Joseph P. Fiore and assigned to the assignee of the present invention. The plant is highly automated and attains outstanding efficiency requiring a small number of operating personnel for a very substantial rate of production. As described in the Fiore application, it is most important that the screening process be conducted in as clean an atmosphere as practicably possible. This leads to such considerations as the use of conditioned air to maintain cleanliness and the construction of equipment to minimize the sources of dirt or contamination. The present invention has to do with both these features of the screening plant that has been disclosed in the Fiore application in illustrating an optimum plant arrangement.

It is, therefore, an object of the invention to provide improved processing apparatus, especially screening apparatus, for cathode-ray tubes.

It is a specific object of the invention to provide apparatus for maintaining improved operating conditions for the screening and other processing apparatus of tri-color cathode-ray tubes.

It is another specific object of the invention to provide apparatus which establishes an optimized atmosphere for the work stations of cathode-ray tube screening apparatus, minimizing the sources of dirt or contamination.

In accordance with one feature of the invention, cathode-ray tube processing apparatus comprises an endless conveyor for transporting a multiplicity of workholders through a plurality of work stations along a closed path disposed in a substantial horizontal plane. A housing with vertically extending walls on opposite sides of the path of travel of the workholder encloses at least one, but preferably all, of the automated stations of the tube processing apparatus. An air conditioning system is coupled to that housing at a point above the work processing area of the enclosed stations and delivers conditioned air directed vertically downwardly. An exhaust duct in communication with the housing at a point below the area of the enclosed stations establishes laminar flow of conditioned air downwardly across the workholders at the enclosed work stations.

In accordance with another feature, the invention contemplates a screening cart for traversing the path defined by the endless conveyor. That cart comprises a carriage frame with a workholder for accommodating a component of the cathode-ray tube for rotation about a first axis. There are support means mounted on the carriage frame for rotation about a second axis normal to the aforesaid first axis and for rotatably supporting the workholder. A driving motor is carried by the carriage frame and a continuous mechanical driving connection is established from the motor to the workholder to rotate the workholder about its axis irrespective of the position of the cart along its path of travel. A cam follower extends from the means which support the workholder on the carriage frame. This cam follower extends into engagement with guide rails defining a cam track along the conveyor path contoured to displace the workholder relative to the aforesaid second axis in accordance with the contour of that track. Finally, there are means for mechanically coupling the carriage frame to the endless conveyor of the screening apparatus.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 9:
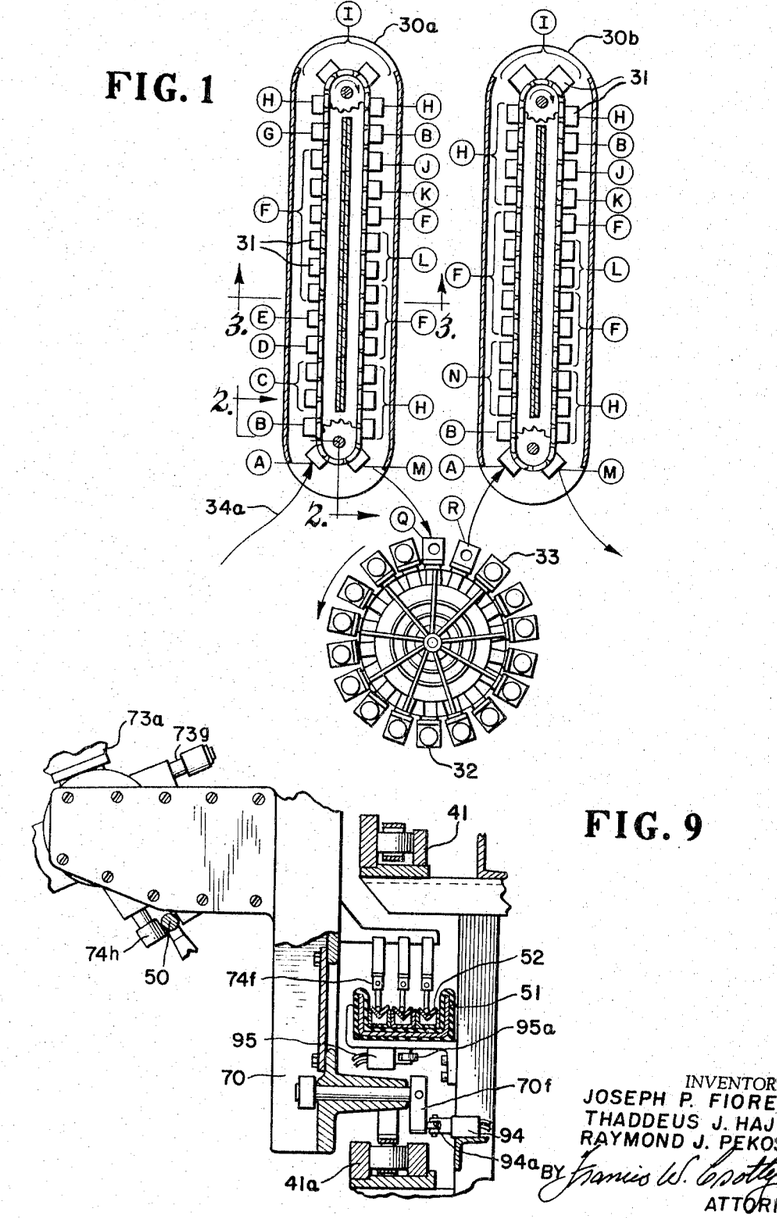
FIGURE 1 is a plan view of a screening layout for depositing phosphor dots on the screen section of a color cathode-ray tube.
FIGURE 9 is a detail view pertaining to intermix tube processing.

The layout of FIGURE 1 represents screening apparatus for applying deposits of phosphor to the end cap or screen section of a color cathode-ray tube. It illustrates the same type arrangement as described in the Fiore application but simplified to show merely two screening conveyors and one light-exposure conveyor. These components cooperate in laying down one family of phosphor dots on the tube screen although a complete screening arrangement deposits three similar and interlaced families of phosphor dots characterized by emitting radiations of green, blue and red in response to the impingement of a cathode-ray beam. Since the present invention may be completely understood from consideration of so much of the screening plant as deposits the green phosphor dots, the illustration of FIGURE 1 has been confined accordingly. Reference may be had to the Fiore application for a disclosure of the screening arrangement in its entirety.

The screening apparatus, as shown, comprises two similar endless conveyors 30a and 30b, individually in the form of a closed, elongated loop and arranged in alignment and with their longitudinal axes in parallel relation with one another. Each such conveyor has a series of screening carts having workholders for individually supporting the screen section of a color television tube and for transporting the screen from a loading station through a multiplicity of screen processing stations to a discharge station of that conveyor. The small rectangles 31 represent the screening carts of each conveyor and each such cart has its own workholder as will be described more particularly hereinafter. Thirty such carts are represented in each of the screening conveyors and the conveyors have an intermittent or step-by-step index type of drive from which it may be seen that there are 30 stations on each conveyor devoted to loading, work processing and discharge or unloading. The lettered circles depict specific ones of these stations and similar designations as between the several conveyors designate like stations from the standpoint of manipulation or work process conducted. The following table assigns for each station the process step that takes place, the angle of the axis of rotation of the tube screen in that station relative to vertical and the speed of rotation of the screen about its central axis, that is to say, the axis that corresponds to the longitudinal axis of the tube into which the screen is ultimately assembled. The details by which varying speeds and varying angles of tilt are imposed on the work table will be made clear subsequently.

TABLE I

| Station | Function | Workholder | |
|---|---|---|---|
| | | R.P.M. | Tilt ° |
| A | Load | 0 | 25 |
| B | Sense | 0 | 120 |
| C | Wash | 10 | 180 |
| D | Rinse | 10 | 180 |
| E | PVA Spray | 10 | 180 |
| F | Dry | 100 | 120 |
| G | Forced Air Cooling | 100 | 120 |
| H | Cooling | 100 | 25 |
| I | Inspection | 0 | 25 |
| J | Slurry Dispense | 6 | 25 |
| K | Slurry Reclaim | 120 | 25 |
| L | Trim and Dry | 20 | 120 |
| M | Unload | 0 | 25 |
| N | Develop | 100 | 120 |

The cross-hatching of the screening conveyors 30 in FIGURE 1 represents a housing of vertical walls and because of the housing the sides of each conveyor loop are enclosed. It is desirable, of course, that the enclosing walls be transparent at least in part to permit observation of the work functions being carried out. The end portions of each conveyor loop, however, are exposed because the operations performed there are manual, namely, those of loading, unloading and inspection.

In addition to the screening conveyors 30, there is another endless conveyor 32 which, for convenience of differentiation from the screening conveyors, will be referred to as a merry-go-round, having a loading station Q and a discharge or unloading station R. The merry-go-round is positioned with its terminal stations Q, R disposed between and adjacent the end portions of the screening conveyors to the end that discharge station M of screening conveyor 30a is in close physical proximity to loading station Q of merry-go-round 32. Discharge station R of this merry-go-round is similarly located in close proximity to loading station A of screening conveyor 30b.

The merry-go-round has a series of light-exposure housings 33 popularly referred to as exposure carts, the details of which are of no particular concern to the subject invention. Suffice it to say that each exposure cart supports and selectively exposes predetermined portions of a photosensitive coating which has previously been deposited on the tube screen section accommodated by a particular cart. The exposure is accomplished as the merry-go-round transports that exposure cart with the screen section from the loading station of the merry-go-round to its discharge station. Of course, the photosensitive resist materials which are normally deposited along with the phosphor coating on the screening conveyor have a predetermined development time and the speed of the merry-go-round is preferably adjusted so that the travel from load to discharge takes at least this same amount of time. It is also desirable to relate the movement of the merry-go-round to the movement of the screening conveyors. Since a series of discrete processing steps of very different types are carried out in the many states of each screening conveyor, it is most convenient that the screening conveyors have an intermittent or step-by-step drive so that the screening carts of each conveyor are stepped from station to station. It is preferred that the merry-go-round have an effective index time that is related to the index time of the conveyors with which it is associated. The effective index time of the merry-go-round is the time required for an exposure cart to travel from a given point in discharge station R to the corresponding point in loading station Q. In particular, the exposure cart preferably advances from its discharge to its loading station in a time equal to the index time of the screening conveyors.

*Overall operation*

In considering the overall operation of the described arrangement, it will be understood that it is essential to maintain an atmosphere and environment as clean as practicably possible. Accordingly, the conveyors are housed in a room that is kept clean and has carefully protected entrances to preserve its cleanliness. The preferred arrangement for maintaining an essentially clean environment for the work stations of the screening conveyors will be considered more particularly hereinafter. It is sufficient at the moment to say that the portions of the screening conveyors 30 that are enclosed by the housing of the conveyor are constantly bathed in a controlled stream or flow of precisely conditioned air.

Each screening conveyor is driven in the direction indicated by the arrows by a conventional index type of intermittent or step-by-step drive. It has been found that an index interval of approximately 28 to 30 seconds is adequate for the processes of screening conveyors 30a and 30b.

It is also preferred that interlocks be provided at any station where, in conducting the work assigned to that station, mechanism of any kind is advanced into the path of travel of the screening carts or the screen sections mounted thereon. The interlock may take the simple form of a microswitch which in its open condition causes the index drive of the conveyor to be interrupted but the microswitch is closed by the return of the movable components of the working station to their normal or rest positions clear to the path of travel of the screening carts and the screen sections under process. It is not believed necessary to show the electrical system of the index drive incorporating the protection of the interlocks. Their association would be essentially that of a series circuit, requiring all interlocks to be closed before the indexing circuit is permitted to perform.

Merry-go-round 32 rotates continuously in the direction indicated by the arrow and at a speed to correlate lighthouse loading to screen conveyor unloading as described above.

In operation, the screen sections to be processed are delivered to loading station A of screening conveyor 30a by a conveyor feeding in the direction of arrow 34a. As color tubes are currently made, the screen section is the cap of the envelope with a surface to bear the phosphors and a peripheral flange through which the screen section may be integrated with the funnel and neck section by a sealing process. It has been determined that optimum results are attained through the practice of pairing by which is meant that each screen employs its own shadow mask as an exposure device in the screening process and, therefore, each cap delivered to the screening room has its mask along with it.

The operator loads a screen section onto a screening cart at station A of conveyor 30a and also loads its mask on the same screening cart. The conveyor then indexes to position B where the cart is sensed to determine whether or not it bears a screen; if it does, that cart will proceed through the work stations and the screen which it carries will receive the various processing steps. On the other hand, if the screening cart does not carry a screen section, a control system is actuated which disables the function of the various work stations as this particular cart passes through. This control system is no part of the present invention; it is described and claimed in a concurrently filed application Ser. No. 392,010, now Patent No. 3,259,224, of Raymond J. Pekosh, assigned to the assignee of the subject invention.

Assuming that the screening cart to be followed through the conveyor by way of illustration does have a screen section, after leaving sensing station B, it advances to station C where it is detergent washed by a high velocity spray and is then rinsed at station D with warm deionized water. The screen is subjected to a spray of polyvinyl alcohol at station E. In the next stations F, the panel is dried by infrared heaters which may be positioned on the wall sections enclosing the conveyor. At station G, cooling is initiated and a fan may be employed to direct conditioned air, which is bathing these stations, more particularly into the screen section. Further cooling is accomplished at station H and the screen is manually inspected at stations I. If any defect is observed, the screen is unloaded and its cart is manually adjusted to disable the automatic processing apparatus at subsequent stations but only while this cart is present in any such station. On the other hand if the screen passes inspection, it continues through the work stations on the other side of the conveyor. Station H is for further cooling and at station B a further sensing operation takes place. Sensing at this station is a mere precaution and may be omitted, relying on the inspector to adjust any screening cart which has carried a screen section that failed to pass inspection.

At station J, a charge of slurry is deposited on the screen. This slurry contains green phosphor material as well as a photosensitive resist and the rotation of the workholder on the screening cart distributes the slurry evenly across the entire screen section. At the next station K, a probe in the form of a cylindrical tube is lowered into the rotating screen to collect or reclaim excess slurry, the slurry being displaced into the tube through centrifugal force and gravity and returned to a reservoir in a closed circulating system with infrared heaters.

After preliminary drying at station F the cap advances to station L where a trim probe is introduced over the skirt of the panel. The trim probe is a water jet which cuts the slurry deposit just above the meeting line of the screen and its peripheral flange. Following the trim step, the panel is further dried at stations F and cooled in the final stations H from which it advances to discharge station M.

The screen section with its mask has now completed a traverse of the first screening conveyor and is ready for exposure. The mask is first positioned within the screen section and the assembly is removed from conveyor 30a and placed on the exposure cart instantaneously at loading station Q of merry-go-round 32.

The light source in each cart of merry-go-round 32 is positioned to simulate the location of the green gun in the finished tube, assuming that the process is directed to the production of a three gun shadow mask tube. The screen section under consideration is subject to exposure in its cart in order to locate the dots of green phosphor on the screen. Each lighthouse has its own timing device which may be a chronometer or may be a light integrator. The first maintains an exposure for a fixed period of time and the latter maintains an exposure sufficient to achieve a desired total integration of incident light. Generally, operating times can be established that permit use of a timing or clock mechanism on the exposure cart. The clock mechanism removes a shutter from the light path of a high pressure mercury lamp as the cart leaves loading station Q and returns the shutter to block that light path after the selected exposure interval which will be no more, and generally less, than the time required for this lighthouse to arrive at discharge station R. The exposed screen section with its mask, through which it has been exposed, is now removed from the cart and loaded onto the screening cart at station A of screening conveyor 30b. Of course, the mask is removed from the panel and stored on the screening cart, leaving the panel free for further processing.

Generally, the same steps are carried out on screening conveyor 30b except that the pass from the loading station A to inspection station I is devoted to developing of the green dots. In developing stations N, a spray of warm deionized water, carefully controlled as to pressure, temperature and pattern, removes all except the exposed portions of the phosphor coating that had been applied to the screen on the preceding conveyor 30a. This results from the fact that the exposure of the photoresist in the exposure cart causes the desired dots to be insoluble in water whereas the unexposed portions of the coating remain soluble and, therefore, they wash off at stations N. Concurrently, a water stream directed at the flange of the screen section removes any unwanted residue of green phosphor coating.

The inspector at stations I determines whether or not a satisfactory pattern of green dots has been laid down on the screen. If not, that screen is rejected; otherwise, it proceeds down the other side of conveyor 30b and undergoes essentially the same processing steps as took place in its travel through the corresponding portion of the preceding conveyor. This time, however, the coating includes a blue, rather than a green, phosphor.

It is not necessary to continue the description of the process steps for developing the families of blue and red phosphor dots. They are generally similar to those previously described and are explained, along with details of the various work stations in the Fiore application, Ser. No. 391,864. It is necessary, however, to consider certain details of screening conveyors 30 which embody the present invention.

*Screening conveyor*

Structural details of the screening conveyors are disclosed in FIGURES 2–9, inclusive.

Figure 3:
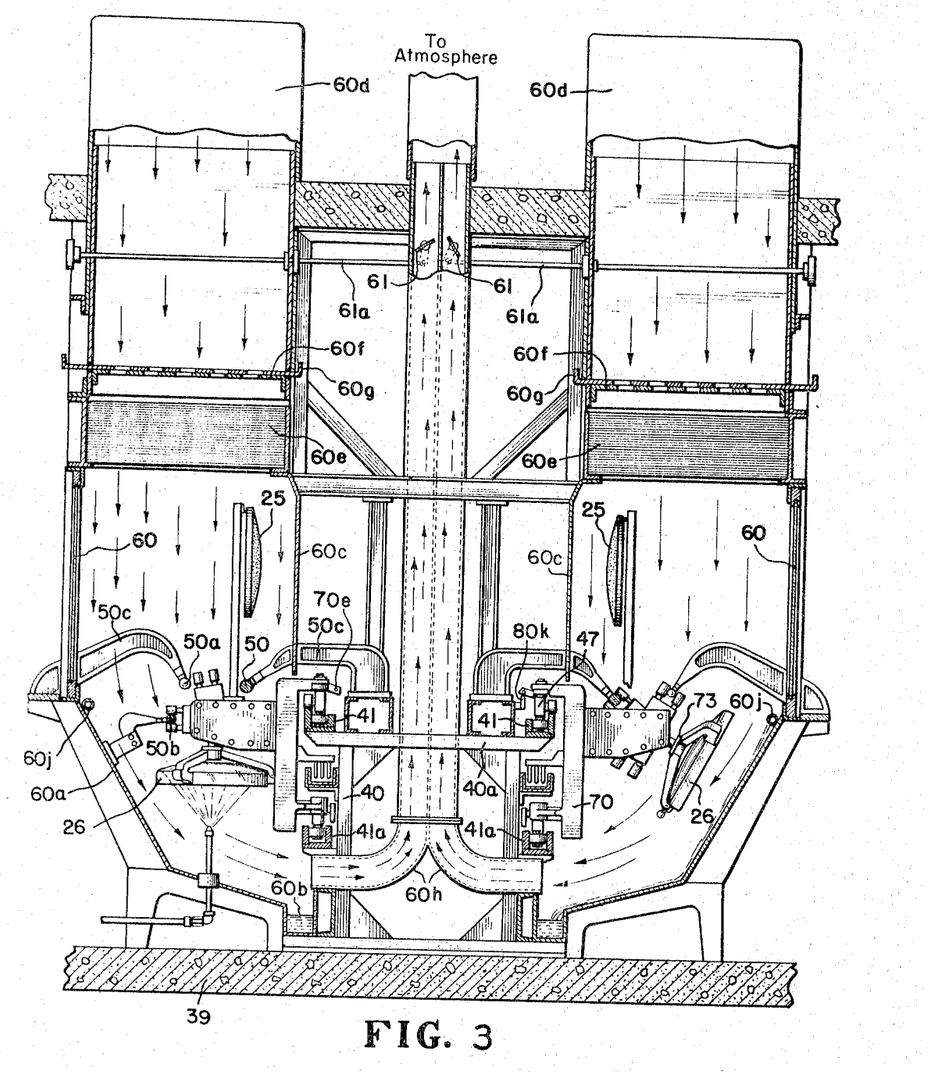
FIGURE 3 is a cross-sectional view taken as indicated by section line 3—3 of FIGURE 1.

The conveyor is structurally supported on a frame 40 of structural steel anchored to the floor 39 of the screening room. As shown in FIGURE 3, the frame, in cross-section, is an open rectangle and supports a pair of runways 41 on opposite edges of the top-most frame member 40a. Each runway is comprised of a pair of vertical rails with a separation dimensioned to accommodate a conveyor chain. Similar rails 41a are supported essentially midway of the base frame also to accommodate a link chain. The outer rails completely inscribe the screening machine and define the closed elongated loop of the conveyor although the innermost rails of each pair has spaced discontinuities to accommodate sprocket drives for advancing the conveyor.

Figures 6, 7:
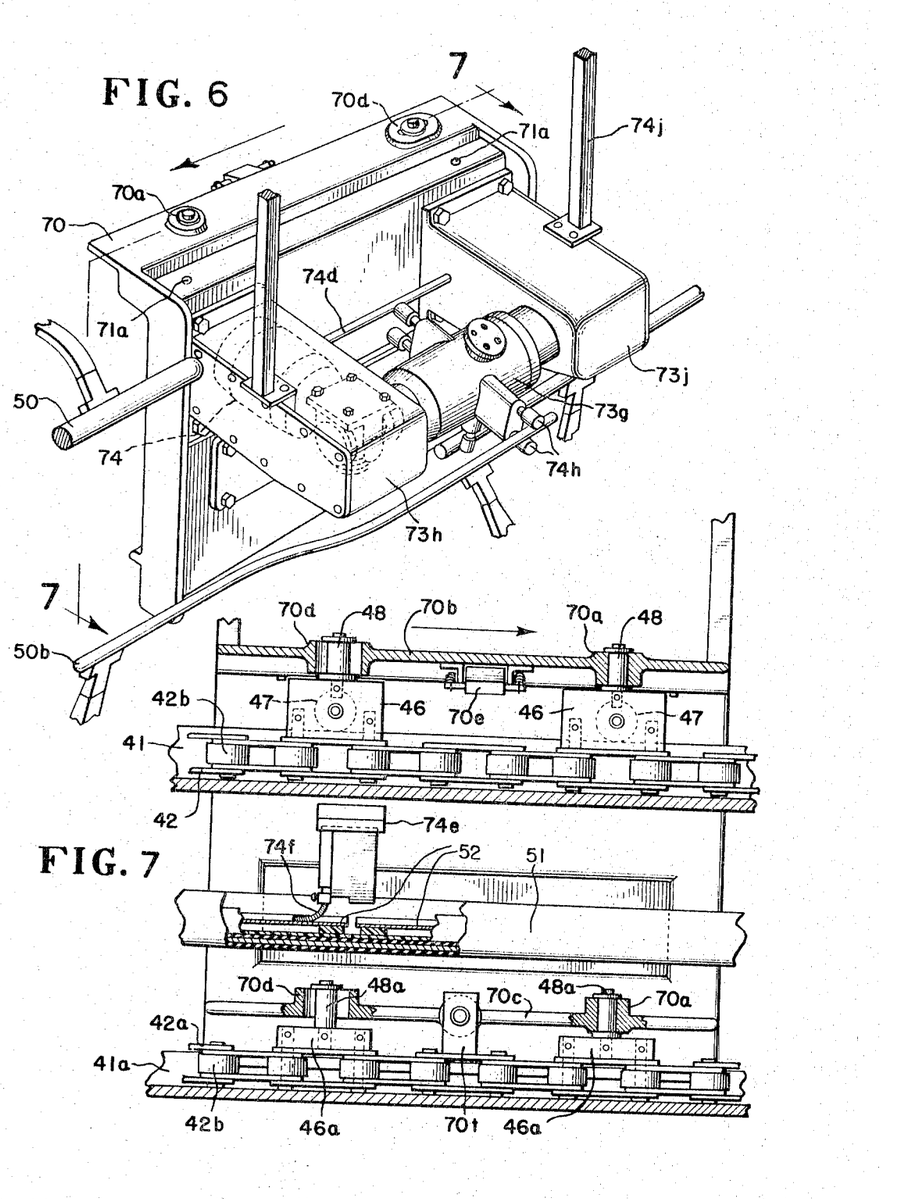

Referring to FIGURE 7, it is seen that the conveyor has a pair of link chains 42 and 42a disposed between rails 41 and 41a respectively. In each case, these chains are continuous closed loops and a pair is provided to make certain that the screening carts transported by the conveyor never get cocked or out of alignment. At each joint or coupling, the conveyor is provided with a horizontally disposed roller 42b and these rollers ride in the tracks 41, 41a. The chains are concurrently driven by sprocket wheels 43, 43a (FIGURE 2) which are driven from a motor 44 through an indexed intermittent drive 45 designed to rotate each gear 90° in each step of the index program. No novelty is predicated on the mechanics of the indexed drive which may have any well-known construction.

Both the upper and lower conveyor chains have provisions through which the many screening carts are mounted thereto. For the upper chain 42 there are a pair of mounting blocks 46 for each such cart. Each block is mechanically coupled to chain 42 at a link joint and each block supports a freely rotatable, vertically disposed roller 47 which engages the upper surface of the outermost element of track 41, utilizing this surface as a bearing or support for most of the weight of the load represented by the screening cart (FIGURES 3 and 7). A mounting pin 48 extends from each block 46 to enter cylindrical mounting bosses of the principal support plate for the screening carts. The hole of at least one such boss is sufficiently larger than the diameter of mounting pins 48, preferably being a slot, to permit relative movement of the conveyor chain and its load to avoid binding. A generally similar arrangement of mounting blocks 46a and mounting pins 48a are provided for the lower conveyor chain to provide further points of coupling with the screening carts. In this case, however, the mounting blocks do not have vertical rollers corresponding to rollers 47 of the upper chain although they may be provided if desired.

Table I records the fact that the workholder of the screening cart assumes different angles of tilt at various operating stations, these angles being chosen to optimize conditions for the performance of a particular work function. The angular relation of the workholder is determined by cam followers cooperating with guide or tilt rails that may be considered part of the conveyor structure.

Figures 4, 8:
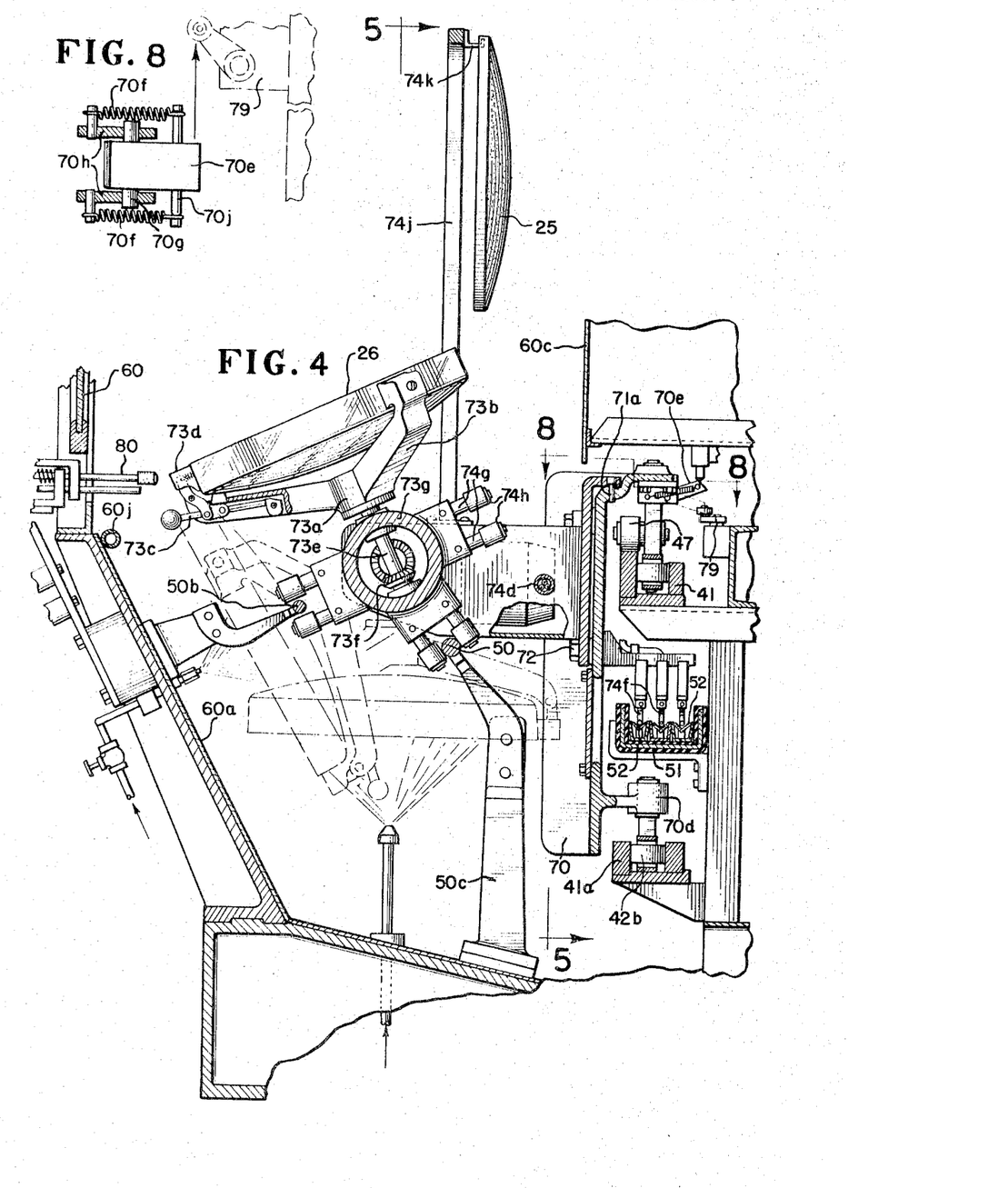
FIGURE 4 is a cross-sectional view taken along section line 4—4 of FIGURE 2.
FIGURES 5–8, inclusive, are details of the cart employed in the screening conveyors of FIGURE 1.

More specifically, three tilt rails 50, 50a and 50b were employed (FIGURE 3). They are segmented and usually of different rod stock. At any work station, it is preferred that the heavier rail be firmly engaged by cam followers of the workholder to secure the workholder in a particular angular relation as determined by guide rails of lesser cross-section which are contoured as required to change the angular aspect of the workholder as it progresses from one station to the next. The contouring ensures harmonic angular acceleration and deceleration during the tilt movements of the workholder. In FIGURE 4, by way of illustration, the rail 50 of heavy stock is effective in maintaining the angular relation of the workholder and a lighter weight rail 50b is available at the output of this work station to engage the cam follower of the particular workholder to effect angular displacement thereof as it travels from this station to the next. Contouring of such a rail for this purpose is represented in FIGURE 6.

It is preferred that the small diameter rails so adjust the angle of the workholder that, as it approaches a particular station, a heavier rail at that station is appropriately aligned to receive the cam followers of the workholder and maintain the angle that has been established by the contoured small diameter rails. As previously indicated, these rails are segmented and are supported by a bracket arrangement 50c secured to the frame of the conveyor (FIGURE 3).

Table I further records that the rotational speed of the workholder of any screening cart may be different in one work station than in another. For the most part, this result is achieved by the use of segmented power distribution rails which may also, for convenience, be deemed part of the conveyor structure. The base frame 40 of the conveyor supports a U-shaped trough 51 (FIGURE 4) which, like the tracks for the conveyor chains, encircles the entire screening machine. Since it is to distribute electrical power, the trough is insulated from the machine base either by constructing it from insulating material or by using a conductive structural trough which is spaced from the frame by insulation. It is contemplated that the driving power for the workholders will be supplied by variable speed D.C. motors and, therefore, the power distribution system contained within trough 51 has three busses 52 which extend horizontally and are insulated from one another. This is easily accomplished by positioning each bus within an insulating compartment or by separating the busses by intervening walls of insulating material. For any run of the conveyor as to which the workholder is to maintain a fixed speed, the corresponding section of the power distribution system is connected with a generator (not shown) delivering an appropriate terminal voltage. Any other runs of the machine, requiring different rotational speeds of the workholders, are accommodated by having other D.C. sources of appropriate potential connect to their corresponding segments of the power distribution busses in any well-known manner.

*Air conditioning*

It is of material importance that the screening machine have a conditioned air system precisely controlled as to rate of flow, temperature and humidity. The type process carried out in the coating room is sensitive to variations of temperature and humidity. Moreover, the controlled air flow may serve as a wash to protect the work from the contaminating effect of foreign particles whether they are in the ambient atmosphere or result from the work processing.

Figure 2:
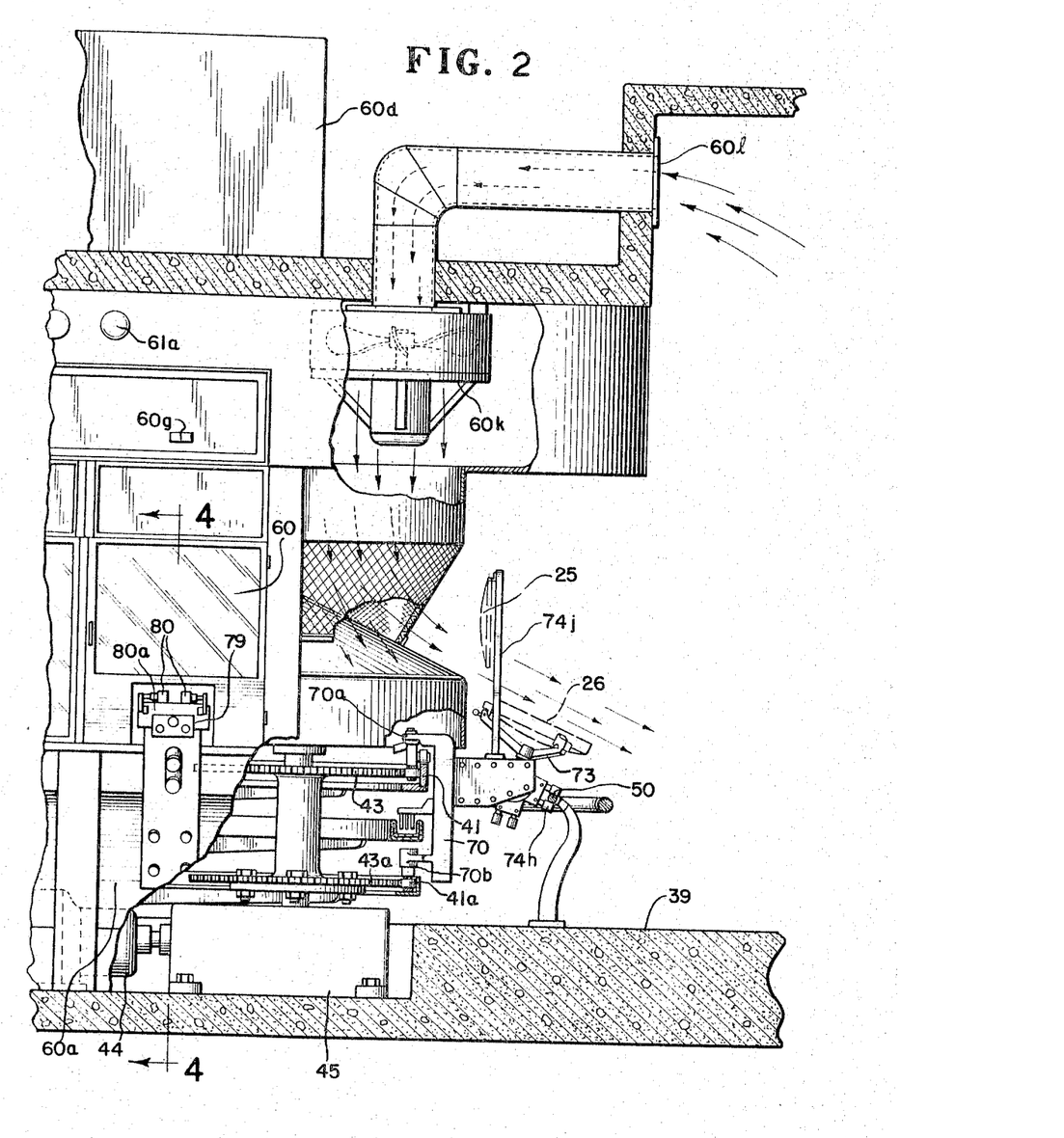
FIGURE 2 is a view, partially broken away, showing structural details of one of the conveyors of FIGURE 1.

The air wash is one feature of the present invention and its details are revealed in FIGURES 1-3, inclusive. Instead of placing total reliance on establishing a chemically clean room for accommodating all of the screening apparatus, the illustrated arrangement employs a screening room that is generally clean and also an air wash or curtain confined to each screening conveyor. For that reason, a housing is constructed to enclose at least some and preferably most of the work stations of each conveyor. Certainly, all stations in which the faceplate under process is wet should preferably be enclosed. This housing has vertically extending walls in space opposed relation on opposite sides of the path of travel of the workholders. Specifically, on each side of the conveyor loop there is a front vertical wall 60 which is formed of glass panelling at least at the level of the work stations to permit observation of the screening process. The front wall of the housing, from a level corresponding approximately to the working level of the stations, is canted inwardly to serve as a baffle 60a that leads to a drain trough 60b formed at very close to floor level.

There is a back wall 60c of the housing in spaced opposed relation to front wall 60 but on the opposite side of the path of travel of the workholders on the screening carts. As shown, the rear wall terminates just above the surface of the screening carts and the succession of carts, in effect, serves as a continuation of the housing vertically downwardly as required to establish a controlled path for an air wash. The housing formed by walls 60, 60c leads to an air conditioning system or other source of conditioned air coupled to the housing at a point above the work processing areas of the stations enclosed by the housing. The source of conditioned air is designated 60d and it may be of any conventional design and construction; no novelty is predicated on the design of this source as such. Preferably, a system is selected which permits precise control of conditioned air delivered vertically downwardly through the housing, controlled as to rate of flow as well as temperature and humidity.

Of course, the conditioned air is as clean as practicable and, if desired, further filtering 60e may be provided in the housing above the level of the work processing stations. A convenient adjustment of the quantity of air delivered to the stations is made possible by a damper 60f. As shown, this is formed of two plates that may have one or more apertures or windows slidable relative to one another to control the effective opening that they collectively afford in the conditioned air housing. A hand grip 60g may be formed on the movable one of these plates to facilitate adjustment.

There is an exhaust duct in communication with housing 60, 60c at a point below the work processing areas of the enclosed stations for establishing laminar flow of conditioned air downwardly across the workholders instantaneously in the enclosed stations. The duct is designated 60h and it is a simple sheet metal structure opening into housing 60, 60c just above the location of drain 60b. Dampers 61, adjustable by means of control levers 61a, are provided in the exhaust ducts. The enclosing walls and exhaust system preferably extend longitudinally of the conveyor throughout most of its length, leaving exposed only the work stations which are at the end portions or bights of the conveyor loops. The exposed portions of the conveyor accommodate the loading and discharge stations A and M at one end and inspection stations I at the other.

It has been previously pointed out that on the first screening conveyor 30a there is a succession of drying stations F followed by a forced air cooling station G. Forced air cooling may be achieved by installing a fan or blower in the front wall 60 of the housing at the work station in question and at a level corresponding to a position of the screen section of the tube being cooled. The blower will deflect the conditioned air that is discharged vertically through the housing, directing it into the screen to accelerate cooling. In order to avoid unnecessarily encumbering the drawings, this blower has not been illustrated.

A water line 60j (FIGURE 3) is positioned adjacent baffle 60a, near the top portion of the baffle and extends parallel to the sides of the conveyor. It has openings or discharge outlets along its length to discharge water directed down the baffle into drain 60b. As a convenience of construction, the water line may extend throughout the length of housing 60, 60c although it is not required at all work stations. The water wash is most helpful in stations such as slurry dispensing, reclaiming and trimming in order to avoid unwanted accumulation of slurry material within the housing of the conveyor. It is also useful at the drying stations to prevent the enclosing structure from becoming too hot.

In one constructed embodiment of the screening apparatus, source 60d supplied conditioned air at a temperature of 75° F. ±1° at a relatively humidity of 50%±2% and at a rate of flow of 75 feet per minute. This, in the absence of any obstacles in the air stream, provides laminar flow of conditioned air downwardly through the work stations as indicated by the arrows in FIGURE 3 within housing 60, 60c and out exhaust ducts 60h which discharge into the atmosphere. Of course, both the screening carts and the automated processing apparatus are present in certain of the stations and preclude perfect laminar flow but the rate employed is a sufficient approximation for the intended result. The turbulence is insufficient to seriously interfere with laminar flow. One advantage of this flow is that the work is continuously washed with air in a manner which, if contaminants are dislodged, they are directed down to the exhaust of the machine. It will be observed, particularly in FIGURE 3, that the mask 25 as hung on the cart is stored vertically within the flow of conditioned air to be washed along with the screen section 26 that is being worked upon in the station.

The manipulations at the exposed stations at the ends of the conveyor are carried on by operators and it is desirable that they, too, stand in an air wash to preclude clothing dirt from contaminating the screening process. This result is obtained by providing means for establishing a flow of air directed vertically downwardly and radially outwardly of the exposed end portions of the conveyor and the work stations located at such end portions (FIGURE 2). For this purpose, room air is recirculated by means of a blower 60k which directs the air through a filter downwardly and across the work stations and the operator attending them, the flow being indicated by the arrows. Recirculation is through a return duct 60l at the ceiling of the screening room.

Screening cart

Another feature of the invention is the screening cart for conveying tube sections through the various work stations. The structural details of the screening cart are shown in FIGURES 4–8. It has two separable principal parts, one of which is a carriage frame 71 to which the workholder and most of the accessories of the cart are affixed. The other is the means, or carriage frame support plate 70, for mechanically coupling the carriage frame to the conveyor. The support plate 70 appears in detail in FIGURES 6 and 7. It has the cylindrical bosses 70a in a top flange 70b and in a shelf 70c projecting in the direction of the conveyor near the lowermost edge of plate 70. It further has elongated bosses 70d in flange 70b and in shelf 70c and the four bosses accept mounting pins 48, 48a to mechanically couple the support plate of the screening cart to the conveyor. After the plate is in position, it may be convenient to provide a washer or other locking element to prevent any of the pins from inadvertently withdrawing from the mounting boss of the support plate. A control member or flag 70e is also mounted to flange 70b of the support plate through an over-center arrangement of springs 70f (FIGURE 8) which causes the flag to be a two position device. The flag has a pivot pin 70g rotatably secured between fingers 70h carried by flange 70b and, forwardly of pin 70g, the flag carries an anchor pin 70j for springs 70f. This is a well recognized over-center construction and permits the flag to have two discrete positions, one above and the other below the plane of pivot pin 70g. The flag is an important part of the control system referred to in connection with sensing. If the workholder contains a tube cap at the time it is sensed, flag 70e is moved to its effective position in which it contacts switch 79, closing it and permitting the automated station associated with that switch to perform its function. On the other hand, if the workholder does not contain a tube section when sensed, flag 70e remains in a rest position in which it passes over switch 79 without actuating it. Then the work station is temporarily disabled. This control arrangement is described and claimed in application Ser. No. 392,010 filed concurrently herewith in the name of Raymond J. Pekosh.

The other principal part of the screening cart, namely carriage frame 71, couples to support plate 70 by means of a pair of pins 71a provided near the edges of an upper flange of frame 71 (FIGURES 4 and 6). These pins are received in mounting holes of support plate 70. If desired, one or more hold-down bolts 72 may thread into support plate 70 to lock frame 71 in position after the pins have been properly seated.

In order for the screening cart to convey the cap or screen section 26 for the color tube through the screening conveyor, it has a removable workholder 73 having a central hub 73a and three arms 73b only two of which appear in FIGURE 4. The inner surfaces of these arms have a protective resilient covering or pads to protect against scratching of the tube cap 26 and one arm has a clamp 73c constructed within it. As is evident in FIGURE 4, the clamp has a handle which may pivot downwardly to remove a jaw 73d from its clamped to its released position, whereas displacement of the handle to the position shown in FIGURE 4 restores the clamp to its closed position. Workholder 73 through its clamp supports the cap 26 of a color tube for rotation about a first axis, namely, the central longitudinal axis of the workholder. To this end, the workholder has a depending shaft 73e which terminates in a driven gear 73f.

The workholder, in turn, is secured to frame 70 by a support means that is rotatable about a second axis normal to the axis of rotation of the workholder. As shown, this support is a cylinder 73g which is rotatably supported by bearings accommodated within a pair of housings 73h and 73j located on opposite edges of the front panel or face of carriage frame 71 (FIGURE 6). Cylinder 73g is also provided with suitable bearings which rotatably support drive shaft 73e of the workholder (FIGURE 4).

Within housing 73h there is disposed a variable speed driving motor and reduction gear system 74. For the case at hand, a D.C. motor is employed and a conventional slip clutch couples the output of the speed reducer to a drive shaft 74a positioned coaxially with cylinder 73g and terminating in a driver gear 74b. The driver gear is in continual meshing engagement with driven gear 73f of the workholder and affords a continuous mechanical driving connection from motor 74 to the workholder to rotate the workholder irrespective of the position of the screening cart along the path of the conveyor, dependent only on whether or not the driving motor is energized.

Housing 73j encloses a speed control potentiometer 74c in order that vernier adjustments may be made of the motor speed. Also enclosed within housing 73j is a cable connector through which the energizing circuit for motor 74 may be extended to the power distribution busses 52. A cable 74d between the two housings 73h and 73j puts the motor and its control 74 in circuit with the power connector (not shown). The power connector assembly connects to a power plug which forms the termination of a brush assembly 74e carried by support plate 70 (FIGURE 7). There are three brushes 74f in this assembly, one for each of the power distribution rails and their connectors lead to the plug of this assembly. Housings 73h and 73j are completely enclosed and a side panel of each is removable to give access to motor 74 and the power circuit. These housings seal the motor and reduction gear assembly which is desirable as a protection against their contributing dirt or contaminants to the screening machine. They also seal the power connections which is desirable as a protection against hazards should there be explosive conditions present in any work station.

It will be noted that the power busses 52 are accommodated by a trough 51 which permits the rails to be immersed in an insulating liquid such as deionized water if that is desirable. Certainly, if copper busses are employed for power distribution, it may be highly desirable to immerse the rails because of the extreme sensitivity of the screens to copper flakes and dust. With stainless steel rails, however, it is not found necessary to have them immersed in fluid.

The angular relation of workholder 73 relative to a vertical axis is under the control of tilt rails 50 and cam followers extending from support cylinder 73g into engagement with these rails to displace the workholder in accordance with the contour of the cam track which they provide. Three sets of cam followers are shown (FIGURE 4) each of which includes a pair of rods 74g which terminate in rollers 74h freely rotatable on the rods. The cam followers are dimensioned so that the engagement with the large guide rail 50 (FIGURE 4) holds the workholder firmly at one angle. At the same time, the other guide rails 50b being of relatively smaller diameter give sufficient freedom of motion between the cams and the rails to accomplish large angular displacements of support cylinder 73g about its axis of rotation in the course of a relatively small lineal travel of the cart, the axial displacement being determined by contouring of the small diameter guide rails 50b. Representative angles to which the workholder is displaced in this traverse around the conveyor loop are indicated in FIGURE 4. The full line showing is a displacement of 25° relative to the vertical, the phantom illustration next following in a counterclockwise direction is at 120° and the remaining phantom illustration is a displacement of 180°.

It is preferred that workholder 73b be removably affixed to cylinder 73g and this may be accomplished by terminating shaft 73e in a mounting plate to which the spider of the workholder may be secured by machine bolts. The representation of FIGURE 6 is of the cart with the workholder removed.

Since pairing is practiced in this screening process, it is essential that mask 25 be maintained in direct association with its screen section 26 throughout the screening process. Accordingly, a U-shaped frame 74j is secured to carriage frame 71 and the screen 25 may be freely suspended from a clamp or hook 74k at the top of the frame.

Figure 5:
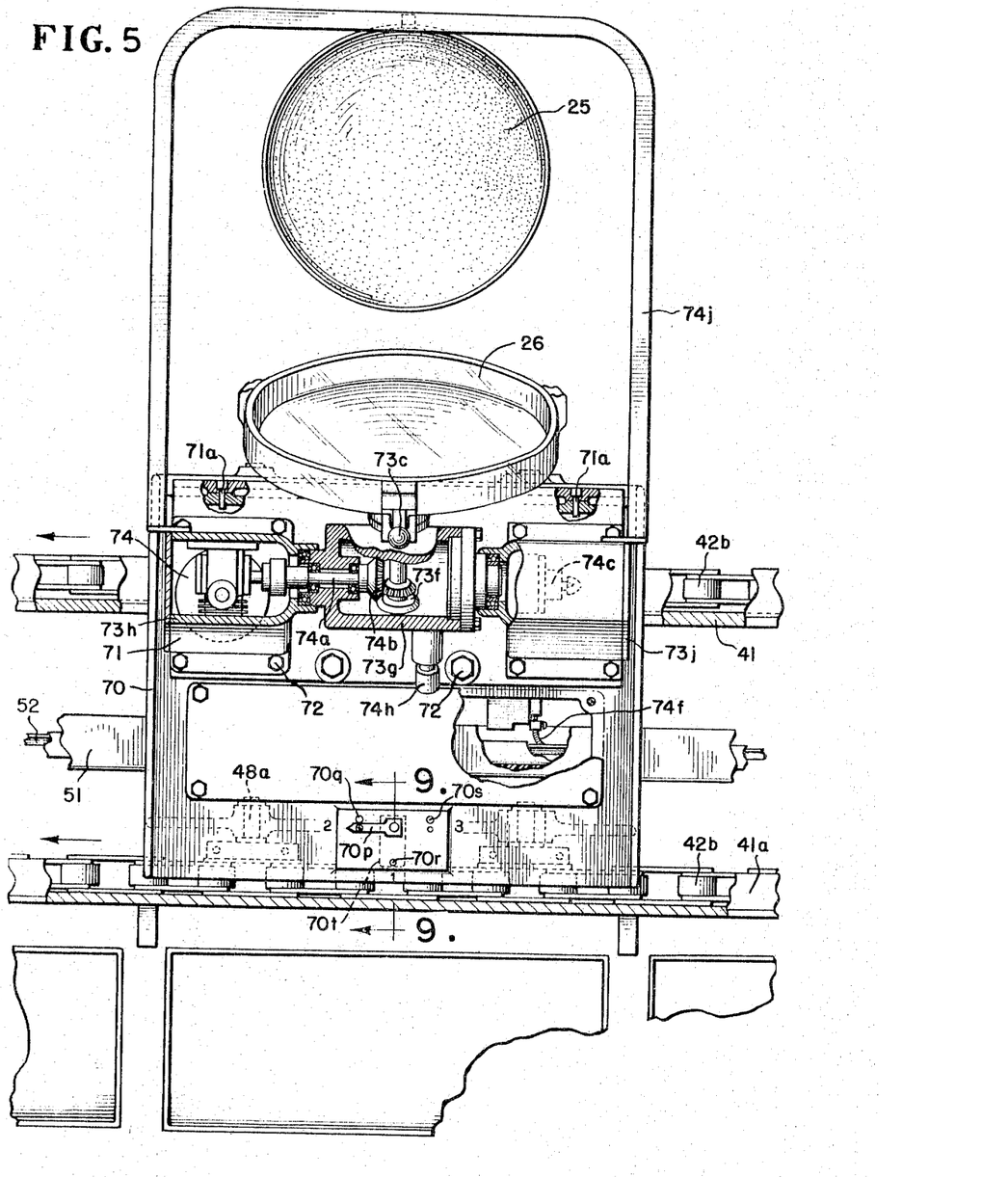

In using the screening cart, at station A of any conveyor workholder 73 is manually rotated, if necessary, to bring clamp 73c in the position shown in FIGURE 5. This clamp is then released and the top cap 26 placed within the workholder and secured by closing the clamp. At the same time, the mask 25 associated with the cap is suspended from frame 74j. As the screening cart travels with the conveyor, workholder 73 is rotated about its longitudinal axis under the control of motor 74 as it is energized by the power distribution rails 52 disposed along the whole run of the conveyor. There are certain stations, such as loading station A, where the motor is not energized and the workholder is not rotated. The various speeds and conditions of rotation are set forth in Table I.

Also, as the screening cart traverses the machine, engagement of tilt rails 50 by cam followers 74h controls the angular relation of the workholder for optimum positioning for the work to be accomplished at each of the several work stations.

*Intermix*

It is highly desirable that the screening apparatus lend itself to the processing of an intermixture of tubes which may have different sizes and/or different configurations. The described plant has that attribute. By way of illustration, one may expect to have to deal with round or rectangular tubes of different screen dimensions. It may be necessary to have alternate sets of workholders dimensioned and/or shaped to accept particular ones of this variety of tubes. Since the workholding frame 73 of the screening cart is readily removable from the cart, the workholder may be changed, if necessary, to accommodate the tube to be processed.

Where the tube shape changes or where the size changes, it may necessitate specific changes in the processing of one or several of the automated work stations of the screening conveyors. By having two or more rather than a single process timer at any such station, it is a simple matter to have the process controlled by the screening cart to determine the specifications of the function carried on at the work station. Accordingly, carriage frame support plate 70 of the screening cart is provided with a process selecting lever 70p (FIGURE 5). It has three positions to which it may be placed, these are designated 70q, 70r and 70s. In each such position, a flag 70t on the chain side of support plate 70 is moved to a specifically different location corresponding to the level of process selector switches that may be provided in any station in which the program is to be modified to accommodate a change in tube size or configuration. The location of selector 70p then causes actuation of the appropriate process switch assuming that the selector has been adjusted properly to reflect the character of the tube under process.

FIGURE 9 shows an arrangement in which there are a pair of microswitches 94, 95 each of which has a roller-type actuator 94a, 95a. Switch 94 is positioned at such a level on the frame of the screening conveyor that it is engaged by flag 70t when selector 70p is in position 70q. The level of switch 95 is such that it is engaged and actuated by flag 70t when selector 70p is in position 70s. For the remaining position 70r of the selector, flag 70t is disposed horizontally between the locations of switches 94 and 95.

In using this mechanism, a work station has a first process timer that is normally effective to control the functions of that station and it accomplishes its task whenever selector 70p is in position 70r. If the tube to be screened requires a change in work process, selector 70p is adjusted to one of its remaining positions 70q and 70s, the one assigned to the particular tube size or configuration in question. Having adjusted the selector, when the screen cart enters a work station for which a process change is to be made, the flag actuates the appropriate one of switches 94, 95 which may either modify the timing of the first mentioned process timer or disable that one and render effective a second process timer having a program schedule required for the tube instantaneously at that station.

The change in programming is made on an individual cart basis because each screen cart has a process selecting provision. Accordingly, it is entirely possible to have an intermixture of a variety of tubes. It is then necessary to correlate the stations of the screening conveyors and the stations of the merry-go-rounds so that the proper exposure table is presented at loading station Q of a merry-go-round at the time it is to be loaded from the discharge station of a screening conveyor. If the number of stations on the screening conveyor is divisable by the number of tube varieties to be processed and if the number of exposure tables on the merry-go-rounds are, likewise, integral multiples of the tube varieties, the programming of these conveyors may be properly correlated. The screening cart accommodating a 25-inch rectangular tube, for example, may be discharged in proper time sequence to the presentation at loading station Q of the merry-go-round of a lighthouse set up for the exposure of that particular tube type.

In addition to the flexibility of intermixing, the described structure has distinct advantages with respect to freedom from contamination. The continuous air wash or curtain enveloping the automated stations contributes materially to this freedom. The provision of separate driving motors on the screening carts for the workholders, as distinguished from friction or other drives coupled to a common driving source also minimizes the sources of contaminations. The motors on the screening carts are sealed within the housings providing a dirt-free and positive drive for the workholders.

While particular embodiments of the invention have been shown and described, it will be obvious to those skilled in the art that changes and modifications may be be made without departing from the invention in its broader aspects, and, therefore, the aim in the appended claims is to cover all such changes and modifications as fall within the true spirit and scope of the invention.

We claim:

1. Cathode-ray tube procesing apparatus comprising:
   an endless conveyor for transporting a multiplicity of screening carts through a plurality of work stations;
   a housing having vertically extending walls in space-opposed relation on opposite sides of the path of travel of said screening carts for enclosing at least one of said work stations;
   an air conditioning system completed to said housing at a point above the work processing area of said enclosed station for delivering conditioned air vertically downwardly;
   an exhaust duct in communication with said housing at a point below said work processing area of said enclosed station for establishing laminar flow of conditioned air downwardly across the one of said screening carts instantaneously in said enclosed station;
   each of said screening carts comprising a workholder for supporting the screen section of a cathode-ray tube;
   means for rotating said workholder about a first axis;
   means for selectively adjusting the angular position of said workholder about a second axis which is normal to said first axis;
   and means for supporting a mask for said screen section in a substantially vertical position for washing by said laminar flow of air in said enclosed station.

2. Cathode-ray tube processing apparatus comprising:
   an endless conveyor for transporting a multiplicity of screening carts through a plurality of work stations;
   a housing having vertically extending walls in space-opposed relation on opposite sides of the path of travel of said screening carts for enclosing at least one of said work stations;
   an air conditioning system coupled to said housing at a point above the work processing area of said enclosed station for delivering conditioned air vertically downwardly;
   an exhaust duct in communication with said housing at a point below said work processing area of said enclosed station for establishing laminar flow of conditioned air downwardly across the one of said screening carts instantaneously in said enclosed station;
   each of said screening carts comprising a workholder for supporting the screen section of a cathode-ray tube;
   means for rotating said workholder about a first axis;
   means for selectively adjusting the angular position of said workholder about a second axis which is normal to said first axis;
   and means for supporting a mask for said screen section above but to one side of said workholder and in a substantially vertical position for washing by said laminar flow of air in said enclosed station.

3. In a cathode-ray tube screening apparatus having an endless conveyor extending along a closed path past a plurality of work stations and having guide rails defining a cam track adjacent said path, a screening cart for traversing said path comprising:
   a carriage frame;
   a workholder for supporting a component of a cathode-ray tube for rotation about a first axis;
   support means mounted on said frame for rotation about a second axis normal to said first axis and rotatably supporting said workholder;
   a driving motor carried by said frame;
   a continuous mechanical driving connection from said motor to said workholder for rotating said workholder about said first axis irrespective of the position of said cart along said path;
   a cam follower extending from said support means into engagement with said cam track to displace said workholder relative to said second axis in accordance with the contour of said cam track;
   and means for mechanically coupling said frame to said conveyor.

4. In a cathode-ray tube screening apparatus having an endless conveyor extending along a closed path past a plurality of work stations and having guide rails defining a cam track adjacent said path, a screening cart for traversing said path comprising:
   a carriage frame;
   a workholder for supporting a component of a cathode-ray tube for rotation about a first axis;
   support means mounted on said frame for rotation about a second axis normal to said first axis and rotatably supporting said workholder;
   a driving motor carried by said frame;
   a continuous mechanical driving connection from said motor to said workholder for rotating said workholder about said first axis irrespective of the position of said cart along said path;
   a cam follower extending from said support means into engagement with said cam track to displace said workholder relative to said second axis in accordance with the contour of said cam track;
   a carriage-frame support plate mechanically coupled to said conveyor;
   and pin and slot provisions in said frame and said support plate for releasably coupling said frame to said plate.

5. In a cathode-ray tube screening apparatus having an endless conveyor extending along a closed path past a plurality of work stations and having guide rails defining a cam track adjacent said path, a screening cart for traversing said path comprising:
   a carriage frame;
   a workholder, having a depending shaft terminated in a driven gear, for supporting a component of a cathode-ray tube for rotation about a first axis corresponding to the axis of said shaft;
   support means mounted on said frame for rotation about a second axis normal to said first axis and rotatably supporting said workholder;
   a driving motor carried by said frame having a drive shaft coaxial with said second axis;
   a drive gear on said drive shaft in meshing engagement with said driven gear to constitute a continuous mechanical driving connection from said motor to said workholder for rotating said workholder about said first axis;

a cam follower extending from said support means into engagement with said cam track to displace said workholder relative to said second axis in accordance with the contour of said cam track;

and means for mechanically coupling said frame to said conveyor.

6. In a cathode-ray tube screening apparatus an endless conveyor extending along a closed path past a plurality of work stations having segmented power distribution rails disposed along said path and having guide rails defining a cam track adjacent said path, a screening cart for traversing said path comprising:

a carriage frame;

a workholder, having a depending shaft terminated in a driven gear, for supporting a component of a cathode-ray tube for rotation about a first axis corresponding to the axis of said shaft;

support means mounted on said frame for rotation about a second axis normal to said first axis and rotatably supporting said workholder;

a driving motor carried by said frame having a drive shaft coaxial with said second axis;

a power supply for said motor including a brush assembly secured to said frame and extending into contact with said power rails;

a drive gear on said drive shaft in meshing engagement with said driven gear to constitute a continuous mechanical driving connection with said motor to said workholder for rotating said workholder about said first axis;

a cam follower extending from said support means into engagement with said cam track to displace said workholder relative to said second axis in accordance with the contour of said cam track;

and means for mechanically coupling said frame to said conveyor.

7. In a cathode-ray tube screening apparatus and endless conveyor extending along a closed path past a plurality of work stations having segmented power distribution rails disposed along said path and having guide rails defining a cam track adjacent said path, a screening cart for traversing said path comprising:

a carriage frame;

a workholder, having a depending shaft terminated in a driven gear, for supporting a component of a cathode-ray tube for rotation about a first axis correspond to the axis of said shaft;

support means mounted on said frame for rotation about a second axis normal to said first axis and rotatably supporting said workholder;

a variable speed driving motor carried by said frame having a drive shaft coaxial with said second axis;

a power supply for said motor including a brush assembly secured to said frame and extending into contact with said power rails for causing said motor to rotate said workholder at a speed determined by the voltage of the power-rail segment instantaneously contacted by said brushes;

a drive gear on said drive shaft in meshing engagement with said driven gear to constitute a continuous mechanical driving connection from said motor to said workholder for rotating said workholder about said first axis;

a cam follower extending from said support means into engagement with said cam track to displace said workholder relative to said second axis in accordance with the contour of said cam track;

and means for mechanically coupling said frame to said conveyor.

8. In a cathode-ray tube screening apparatus:

an endless conveyor extending along a closed path past a plurality of work stations having segmented power distribution rails disposed along said path and having guide rails defining a cam track adjacent said path;

a trough extending coextensively with said power rails for retaining said rails immersed in an insulating fluid;

and a screening cart for traversing said path comprising:

a carriage frame;

a workholder, having a depending shaft terminated in a driven gear, for supporting a component of a cathode-ray tube for rotation about a first axis coresponding to the axis of said shaft;

support means mounted on said frame for rotation about a second axis normal to said first axis and rotatably supporting said workholder;

a variable speed driving motor carried by said frame having a drive shaft coaxial with said second axis;

a power supply for said motor including a brush assembly secured to said frame and extending into contact with said power rails for causing said motor to rotate said workholder at a speed determined by the voltage of the power-rail segment instantaneously contacted by said brushes;

a drive gear on said drive shaft in meshing engagement with said driven gear to constitute a continuous mechanical driving connection from said motor to said workholder for rotating said workholder about said first axis;

a cam follower extending from said support means into engagement with said cam track to displace said workholder relative to said second axis in accordance with the contour of said cam track;

and means for mechanically coupling said frame to said conveyor.

9. In apparatus for screening an intermixture of a variety of cathode-ray tubes having an endless conveyor extending along a closed path past a plurality of work stations at least one of which has several program switches and having guide rails defining a cam track adjacent said path, a screening cart for traversing said path comprising:

a carriage frame;

a workholder for supporting a component of a cathode-ray tube for rotation about a first axis;

support means mounted on said frame for rotation about a second axis normal to said first axis and rotatably supporting said workholder;

a driving motor carried by said frame;

a continuous mechanical driving connection from said motor to said workholder for rotating said workholder about said first axis irrespective of the position of said cart along said path;

a cam follower extending from said support means into engagement with said cam track to displace said workholder relative to said second axis in accordance with the contour of said cam track;

an adjustable switch operator for selectively actuating said program switches of said one work station;

and means for mechanically coupling said frame to said conveyor.

10. In a cathode-ray tube screening apparatus having an endless conveyor extending along a closed path past a plurality of work stations and having guide rails defining a cam track adjacent said path, a screening cart for traversing said path comprising:

a carriage frame to be coupled to said conveyor;

a workholder, having a depending shaft terminated in a driven gear, for supporting a component of a cathode-ray tube for rotation about a first axis corresponding to the axis of said shaft;

support means mounted on said frame for rotation about a second axis normal to said first axis and rotatably supporting said workholder;

a driving motor carried by said frame having a drive shaft coaxial with said second axis;

a drive gear on said drive shaft in meshing engagement with said driven gear to constitute a continuous mechanical driving connection from said motor to said workholder for rotating said workholder about said first axis;

a cam follower extending from said support means into engagement with said cam track to displace said workholder relative to said second axis in accordance with the contour of said cam track;

and housing means for enclosing said motor and said mechanical driving connection from said motor to said workholder.

References Cited by the Examiner
UNITED STATES PATENTS

| | | | |
|---|---|---|---|
| 2,267,273 | 12/1941 | Garbe | 118—57 X |
| 2,295,475 | 9/1942 | Hurxthal | 34—105 X |
| 2,680,816 | 6/1954 | Smith | 34—85 X |
| 2,902,973 | 9/1959 | Weingarten et al. | 118—322 X |

FREDERICK L. MATTESON, JR., *Primary Examiner.*

A. D. HERMANN, *Assistant Examiner.*